(12) United States Patent
Nakao et al.

(10) Patent No.: US 7,437,949 B2
(45) Date of Patent: Oct. 21, 2008

(54) TERTIARY MODE VIBRATION TYPE CORIOLIS FLOWMETER

(75) Inventors: Yuichi Nakao, Tokyo (JP); Seiji Kobayashi, Tokyo (JP); Norio Sukemura, Tokyo (JP)

(73) Assignee: Oval Corporation, Tokyo (JP)

( * ) Notice: Subject to any disclaimer, the term of this patent is extended or adjusted under 35 U.S.C. 154(b) by 175 days.

(21) Appl. No.: 10/592,830

(22) PCT Filed: Sep. 24, 2004

(86) PCT No.: PCT/JP2004/014449

§ 371 (c)(1),
(2), (4) Date: Sep. 14, 2006

(87) PCT Pub. No.: WO2005/090930

PCT Pub. Date: Sep. 29, 2005

(65) Prior Publication Data

US 2008/0156109 A1 Jul. 3, 2008

(30) Foreign Application Priority Data

Mar. 24, 2004 (JP) .............................. 2004-086041

(51) Int. Cl.
*G01F 1/84* (2006.01)

(52) U.S. Cl. ............................................... 73/861.355

(58) Field of Classification Search ................................. 73/861.354–861.357
See application file for complete search history.

(56) References Cited

FOREIGN PATENT DOCUMENTS

| EP | 1790955 A1 | * | 5/2007 |
|---|---|---|---|
| JP | 2000-018994 | | 1/2000 |
| JP | 3058074 | | 7/2000 |
| JP | 2006084372 A | * | 3/2006 |

* cited by examiner

*Primary Examiner*—Harshad Patel
(74) *Attorney, Agent, or Firm*—Wenderoth, Lind & Ponack, L.L.P.

(57) ABSTRACT

In order that a flow tube of a Coriolis flowmeter may be vibrated in a tertiary mode using one drive device, the drive device is arranged at an antinode in the center of tertiary mode vibration, and vibration detecting sensors are arranged at two antinodes other than the antinode in the center of tertiary mode vibration. Moreover, the displacement polarity of the drive device is opposite to that of the vibration detecting sensors so that the vibration phases of the flow tube are in a relation of mutually opposite phases. Furthermore, in a positive feedback loop of an excitation circuit portion for exciting tertiary mode vibration of the flow tube and the vibration detecting sensors, the excitation circuit portion is structured so that the relation between the displacement polarities where the vibration phases of the flow tube are opposite to one another is converted to the relation where the vibration phases of the flow tube are in phase.

4 Claims, 4 Drawing Sheets

(a)

(b)

(c)

(d)

(e)

(f)

TERTIARY MODE VIBRATION TYPE CORIOLIS FLOWMETER

BACKGROUND OF THE INVENTION

1. Field of the Invention

The present invention relates to a tertiary mode vibration type Coriolis flowmeter provided with at least one flow tube.

2. Description of the Related Art

In a Coriolis flowmeter, a tube through which a fluid to be measured flows is supported at one end or both ends thereof, and vibration is applied to a portion of the tube around the supporting point in a direction vertical to the flowing direction of the tube (hereinafter, a tube to which vibration is applied is referred to as a flow tube). The Coriolis flowmeter is a mass flowmeter, which utilizes the fact that the Coriolis forces applied to the flow tube when vibration is thus applied thereto, are proportional to a mass flow rate. The Coriolis flowmeter, which is well known, is roughly classified into a straight tube type and a bent tube type in terms of flow tube structure.

In a Coriolis flowmeter of the straight tube type, when vibration is applied to a straight tube, whose both ends are supported, in a direction vertical to the straight-tube center portion axis, a difference in displacement due to the Coriolis forces is generated between the support portions and the central portion of the straight tube, that is, a phase difference signal is obtained, and, based on this phase difference signal, the mass flow rate is detected. The straight tube type Coriolis flowmeter, thus constructed has a simple, compact, and solid structure. On the other hand, there arises a problem in that it is difficult to achieve high detection sensitivity.

In contrast, the bent tube type Coriolis flowmeter is superior to the straight tube type Coriolis flowmeter from a view point that it allows selection of a shape for effectively obtaining the Coriolis forces. In fact, it is capable of performing mass flow rate detection with high sensitivity. Known examples of the bent tube type Coriolis flowmeter include one equipped with a single flow tube (see, for example, JP 4-55250 A), one equipped with two flow tubes arranged in parallel (see, for example, JP 2939242 B), and one equipped with a single flow tube in a looped state (see, for example, JP 2951651 B).

A Coriolis flowmeter provided with a single flow tube is advantageous in that it can provide a mass flowmeter in a simplest structure and at low cost. On the other hand, in the Coriolis flowmeter provided with a single flow tube, it has a problem in that, when the flow tube is vibrated in a primary mode or an even-number mode, the vibration leaks to an exterior of the mass flowmeter.

To mitigate the vibration leakage to the exterior of the mass flowmeter, there has been devised, as means for mitigating leakage of the vibration of the flow tube to the exterior, a construction in which the single flow tube is vibrated in a tertiary mode by using three drive devices. However, when the three drive devices are used, a number of new problems occur. For example, the wiring for the three drive devices is rather complicated, and the production cost is increased.

SUMMARY OF THE INVENTION

It is an object of the present invention to provide a tertiary mode vibration type Coriolis flowmeter which can be provided in a simple structure and at low cost and which helps to mitigate vibration leakage.

To attain the above object, a tertiary mode vibration type Coriolis flowmeter includes: at least one flow tube supported at opposite end portions having inflow and outflow ports; a drive device for alternately driving the flow tube; and a pair of vibration detecting sensors for detecting a phase difference that is proportional to Coriolis forces acting on the flow tube, and is structured such that: in causing the flow tube to make a tertiary mode vibration using the drive device, the drive device is arranged so as to be situated at the central one of three antinodes generated by the tertiary mode vibration; the vibration detecting sensors are arranged at two of the three antinodes of the tertiary mode vibration of the flow tube exclusive of the central antinode; the displacement polarity of the drive device and the displacement polarity of the vibration detecting sensors are set to be in opposite phase with each other; and, in a positive feedback loop of an excitation circuit portion for exciting the tertiary mode vibration of the flow tube and the detecting sensors, the excitation circuit portion for exciting the tertiary mode vibration is structured so that conversion is effected such that the displacement polarities, which have been in opposite phase with each other, are converted to be in phase with each other. According to the present invention having the above feature, in the tertiary mode vibration type Coriolis flowmeter, it is possible to drive the flow tube with the central antinode alone, where the amplitude is maximum and the drive efficiency is high.

To attain the object of the present invention, in the tertiary mode vibration type Coriolis flowmeter of the invention, to convert the displacement polarities so as to make them in phase with each other in the positive feedback loop, an electric wire, such as an input line or a signal line, is connected inversely or through the intermediation of an inverter. According to the tertiary mode vibration type Coriolis flowmeter of the present invention thus structured, displacement polarities that have been in opposite phase with each other are made in phase with each other by connecting the electric wires inversely in the positive feedback loop of an excitation circuit portion for exciting the tertiary mode vibration of the flow tube and the detecting sensors or through the intermediation of an inverter.

To attain the object of the present invention, in the tertiary mode vibration type Coriolis flowmeter of the present invention, each of the drive device and the vibration detecting sensors is equipped with a coil and a magnet, and the coil is arranged on a stationary member that is separate from the flow tube, with the magnet being arranged on the flow tube. According to the tertiary mode vibration type Coriolis flowmeter of the present invention thus structured, there is no need to mount a coil requiring wiring to the flow tube, so the influence on the vibration of the flow tube is mitigated as much as possible.

According to the present invention, the flow tube is vibrated in a tertiary mode, thereby making it possible to mitigate vibration leakage. Thus, it is possible to provide a tertiary mode vibration type Coriolis flowmeter of high reliability. Further, being equipped with a single flow tube, the tertiary mode vibration type Coriolis flowmeter can be provided in a simple structure and at relatively low cost.

According to the present invention, it is possible for the excitation circuit portion to be of a superior construction.

According to the present invention, the coil requiring wiring is arranged on the stationary member, which is separate from the flow tube, and the magnet is arranged on the flow tube, thereby making it possible to mitigate the influence on the vibration of the flow tube as much as possible.

DETAILED DESCRIPTION OF THE INVENTION

Hereinafter, embodiments of the present invention will be described with reference to the drawings.

Figure 1:
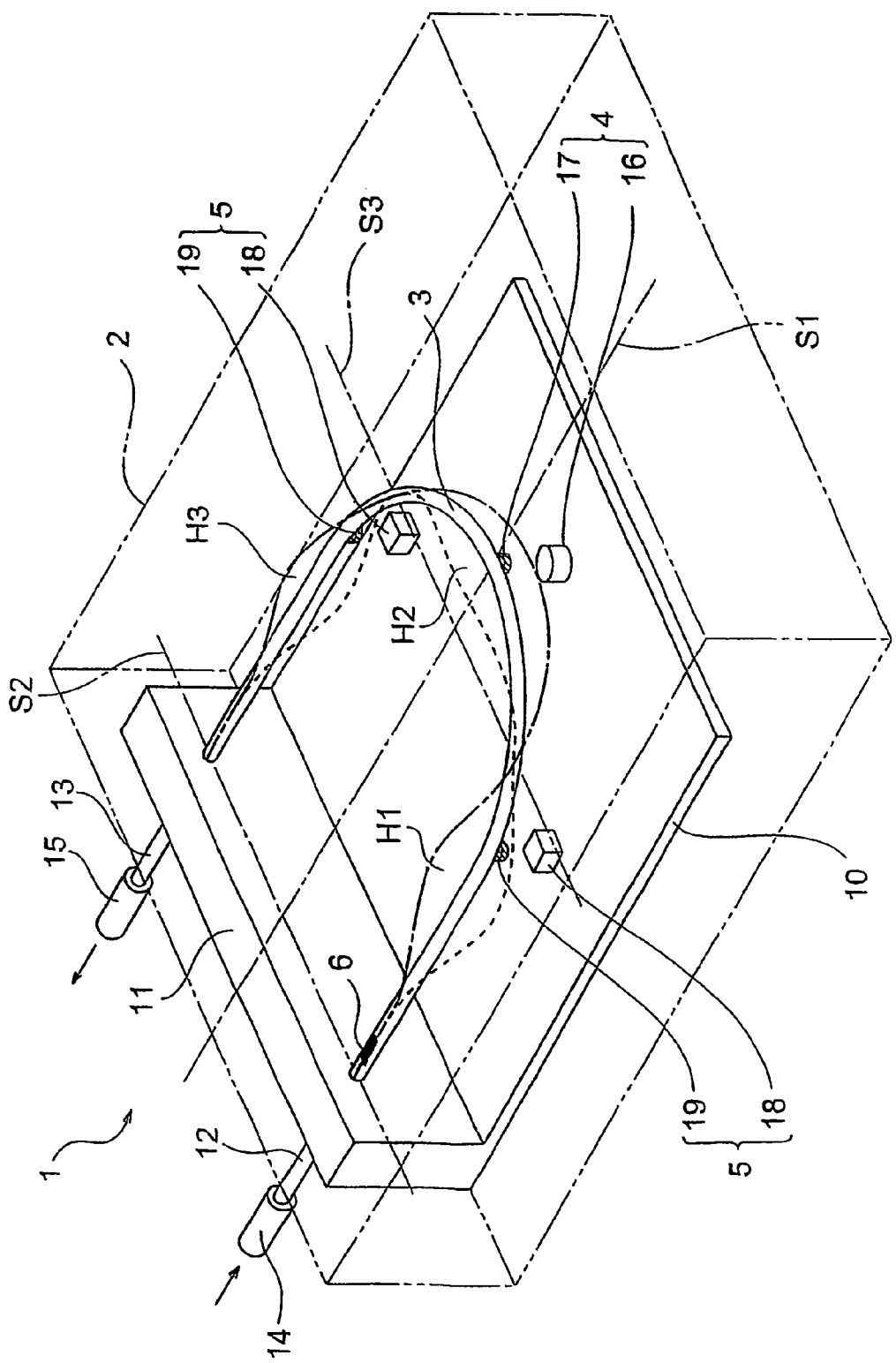
FIG. 1 is a structural view showing a tertiary mode vibration type Coriolis flowmeter according to an embodiment of the present invention.

FIG. 1 shows a tertiary mode vibration type Coriolis flowmeter according to a first embodiment of the present invention.

Figure 2:
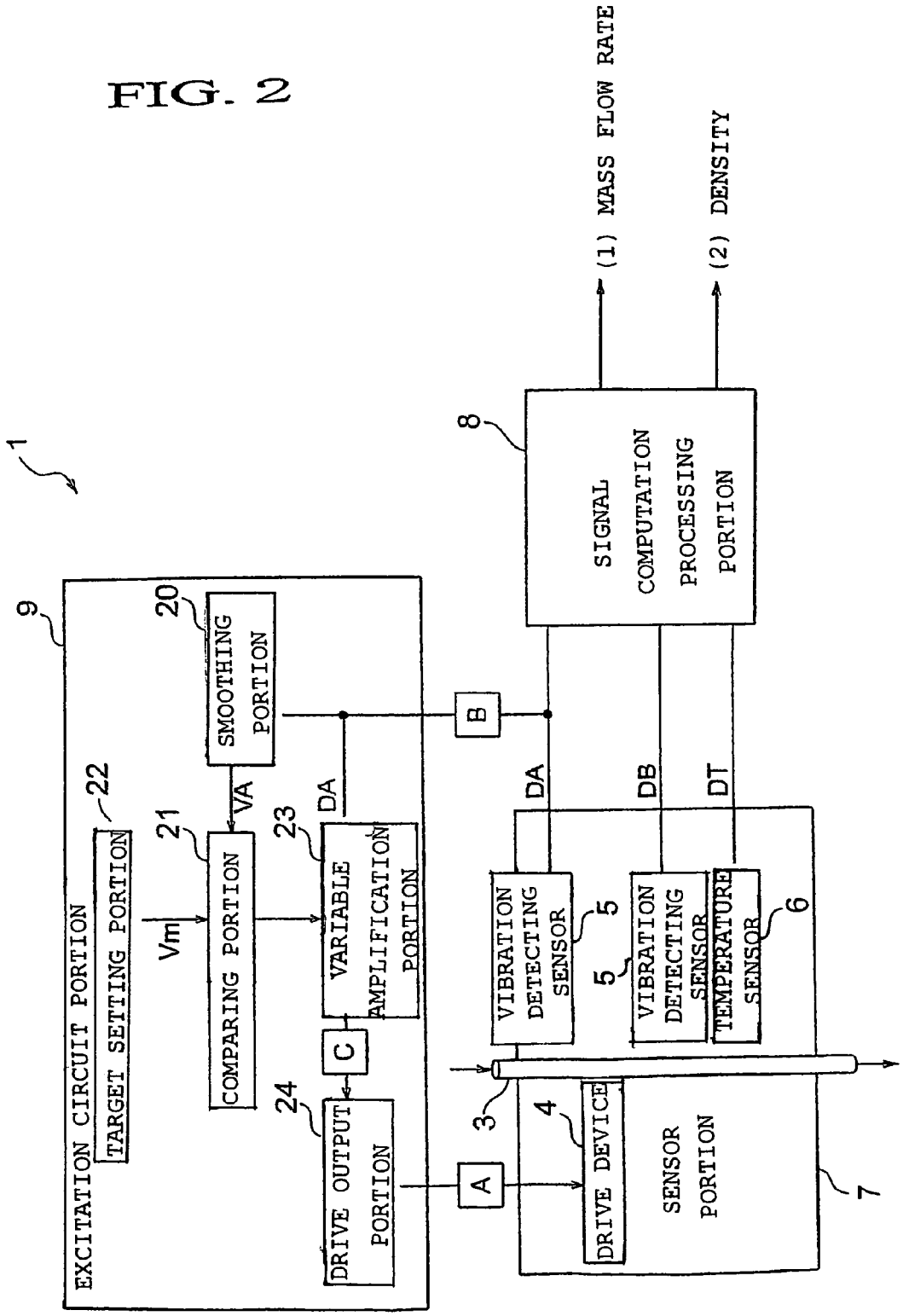
FIG. 2 is a block diagram showing a sensor portion, a signal computation processing portion, and an excitation circuit portion in the tertiary mode vibration type Coriolis flowmeter.

FIG. 1 is a structural view showing a construction of a tertiary mode vibration type Coriolis flowmeter according to the present invention. FIG. 2 is a block diagram showing a sensor portion, a signal computation processing portion, and an excitation circuit portion in the tertiary mode vibration type Coriolis flowmeter.

In FIGS. 1 and 2, a tertiary mode vibration type Coriolis flowmeter 1 according to the present invention includes a casing 2, a single flow tube 3 accommodated in the casing 2, a drive device 4, a sensor portion 7 having a pair of vibration detecting sensors 5, 5 and a temperature sensor 6, a signal computation processing portion 8 for performing computation processing on mass flow rate, etc. based on a signal from the sensor portion 7, and an excitation circuit portion 9 for exciting the drive device 4. In the following, these components will be described.

The casing 2 has a structure resistant to bending and torsion. Further, the casing 2 is formed in a size large enough to accommodate the flow tube 3 and a stationary member 10 arranged parallel to a plane formed by the flow tube 3. Further, the casing 2 is so formed as to be capable of protecting the main portion of the flowmeter such as the flow tube 3. The casing 2 is filled with an inert gas, such as argon gas. Due to the filling with the inert gas, condensation on the flow tube 3, etc. is prevented.

The stationary member 10 is formed, for example, as a flat plate as shown in the drawings, and a part thereof is fixed to the casing 2. Further, a support portion 11 for supporting and fixing the inflow port side end and the outflow port side end of the flow tube 3 is mounted to the stationary member 10 by appropriate means.

The flow tube 3 is composed of a U-shaped curved tube which is symmetrical with respect to a first axis S1; one end portion 12 thereof, which is supported by and fixed to the support portion 11, has an inflow port, and the other end portion 13 thereof has an outflow port. An inflow port side connecting portion 14 is mounted to the inflow port, and an outflow port side connecting portion 15 is mounted to the outflow port. Measurement fluid, which flows into the flow tube 3 from the inflow port through the inflow port side connecting portion 14, flows sequentially through an inflow port side leg portion, a curved portion in the middle, and an outflow port side leg portion before flowing out into the outflow port side connecting portion 15 through the outflow port. The material of the flow tube 3 is one usually adopted in this technical field, such as stainless steel, hastelloy, or titanium alloy.

The drive device 4 forming the sensor portion 7 serves to vibrate the flow tube 3 in a tertiary mode, and is equipped with a coil 16 and a magnet 17. The drive device 4 is provided in the first axis S1 and at the center of the curved portion of the flow tube 3. In other words, the drive device 4 is provided so as to be situated within the range of a central antinode H2 of three antinodes H1 through H3 generated by the tertiary mode vibration.

Further, the coil 16 of the drive device 4 is mounted to the stationary member 10. Further, although not specifically shown, an FPC (flexible printed circuit) or an electric wire is led out from this coil 16. The magnet 17 of the drive device 4 is mounted to the flow tube 3 by using a dedicated mounting tool.

When an attracting action is generated in the drive device 4, the magnet 17 is inserted into the coil 16. As a result, the flow tube 3 is brought close to the stationary member 10. In contrast, when a repelling action is generated in the drive device 4, the flow tube 3 is moved away from the stationary member 10.

Since the flow tube 3 is supported by and fixed to the support portion 11 at both ends thereof, the drive device 4 is alternately driven in a rotating direction around a second axis S2 or a third axis S3 while vibrating the flow tube 3 in the tertiary mode.

The vibration detecting sensors 5, 5 forming the sensor portion 7 are sensors which detect vibration of the flow tube 3 and, at the same time, detect a phase difference that is proportional to Coriolis forces acting on the flow tube 3, with each of the vibration detecting sensors 5, 5 being equipped with a coil 18 and a magnet 19 (Apart from this, it is also possible to adopt, for example, an acceleration sensor, optical means, a capacitance type, or a distortion type (piezoelectric type), which detects one of displacement, velocity, and acceleration).

Of the vibration detecting sensors 5, 5 thus constructed, one vibration detecting sensor 5 is provided at a position which is within the range of the antinode H1 on the inflow port side and which allows detection of a phase difference that is proportional to Coriolis forces. The other vibration detecting sensor 5 is arranged at a position which is within the range of the antinode H3 on the outflow port side and which allows detection of a phase difference that is proportional to Coriolis forces. The vibration detecting sensors 5, 5 are arranged so as to be situated at positions deviated from nodes generated when the flow tube 3 is vibrated in the tertiary mode.

The respective coils 18 of the vibration detecting sensors 5, 5 are mounted to the stationary member 10. Further, although not specifically shown, an FPC (flexible printed circuit) or an electric wire is led out from each coil 18. The respective magnets 19 of the vibration detecting sensors 5, 5 are mounted to the flow tube 3 by using a dedicated mounting tool.

In the first embodiment of the tertiary mode vibration type Coriolis flowmeter of the present invention, the coils 16 and 18 of the drive device 4 and the vibration detecting sensors 5, 5, respectively, are, as described above, mounted at predetermined positions on the stationary member 10 since it is also necessary to effect wiring of an FPC (flexible printed circuit) of an appropriate weight (not shown) or an electric wire (the wiring system is omitted in the drawing). By thus mounting the coils 16 and 18 at predetermined positions on the stationary member 10, the influence on the vibration of the flow tube 3 is mitigated as much as possible.

In the first embodiment of the tertiary mode vibration type Coriolis flowmeter of the present invention, it is also possible to reverse the mounting of the coils 16 and 18 and the magnets 17 and 19 (i.e., to mount the coils 16 and 18 to the flow tube 3 and to mount the magnets 17 and 19 to the stationary member 10).

Although not specifically shown, a substrate or the like is provided inside the tertiary mode vibration type Coriolis flowmeter 1 according to the present invention. Further, connected to the substrate is a wire harness led out to the exterior of the tertiary mode vibration type Coriolis flowmeter 1.

The temperature sensor 6, which constitutes a part of the sensor portion 7, serves to effect temperature compensation on the tertiary mode vibration type Coriolis flowmeter 1, and is mounted to the flow tube 3 by an appropriate means. To be more specific, the temperature sensor 6 is mounted, for example, in the vicinity of a portion on the inflow port side and supported by and fixed to the support portion 11, that is, in the vicinity of the end portion 12. The FPC (flexible printed circuit) (not shown) or the electric wire led out from the temperature sensor 6 is connected to the above-mentioned substrate (not shown).

Wiring and connection is effected on the signal computation processing portion 8 so as to allow input of a detection signal DA from one vibration detecting sensor 5 regarding deformation of the flow tube 3, a detection signal DB from the other vibration detecting sensor 5 regarding deformation of the flow tube 3, and a detection signal DT from the temperature sensor 6 regarding the temperature of the flow tube 3. The signal computation processing portion 8 is constructed such that the computation of a mass flow rate Qm and a density ρ are effected based on the detection signals DA, DB, and DT input from the sensor portion 7. Further, the signal computation processing portion 8 is constructed such that the mass flow rate Qm and the density ρ obtained through computation are output to a display device (not shown).

The excitation circuit portion 9 includes a smoothing portion 20, a comparing portion 21, a target setting portion 22, a variable amplification portion 23, and a drive output portion 24. Further, in vibrating the flow tube 3 in the tertiary mode, the excitation circuit 9 forms a positive feedback loop. In the smoothing portion 20, wiring is effected so as to extract the detection signal DA from one vibration detecting sensor 5 (or the other vibration detecting sensor 5). Further, the smoothing portion 20 has a function by which it effects rectification and smoothing on the input detection signal DA and outputs a DC voltage VA that is proportional to the amplitude thereof. The comparing portion 21 has a function by which it compares the DC voltage VA from the smoothing portion 20 with a target set voltage Vm output from the target setting portion 22 and controls the gain of the variable amplification portion 23 so as to adjust the amplitude of a resonance vibration to the target set voltage.

A construction of the components from the smoothing portion 20 to the drive output portion 24 is the same as that in the conventional case in which vibration is controlled by a positive feedback loop. In the tertiary mode vibration type Coriolis flowmeter 1 of the present invention, to obtain a tertiary mode vibration, the phase of the signal waveform of the positive feedback loop is converted to an opposite phase. That is, in the portion A of FIG. 2, an output line led out from the drive output portion 24 is inversely connected to convert the phase of the output waveform to an opposite phase. Alternatively, in the portion B of FIG. 2, the signal line of the detection signal DA input to the excitation circuit portion 9 is inversely connected to convert the phase of the signal waveform to an opposite phase. Alternatively, in the portion C of FIG. 2, wiring led out from the variable amplification portion 23 is inversely connected to convert the phase of the amplification waveform to an opposite phase. Alternatively, in the portion A of FIG. 2, the phase of the output sent out from the drive output portion 24 is converted to an opposite phase by using an inverter. Alternatively, in the portion B of FIG. 2, the phase of the detection signal DA input to the excitation circuit portion 9 is converted to an opposite phase by using an inverter. Alternatively, in the portion C of FIG. 2, the phase of the output sent out from the variable amplification portion 23 is converted to an opposite phase by using an inverter (To be more specific, the drive device 4 is arranged so as to be situated at the central antinode H2, and the vibration detecting sensors 5, 5 are arranged at the antinodes H1 and H3, and, further, the displacement polarity of the drive device 4 and the displace polarity of the vibration detecting sensors 5, 5 are adjusted so as to be in opposite phase with each other. Further, in the positive feedback loop of the excitation circuit portion 9, conversion is effected on the displacement polarities, such that they are converted to be in phase with each other).

When, in the above construction, measurement fluid is caused to flow through the flow tube 3, and the drive device 4 is driven to vibrate the flow tube 3 in the tertiary mode, the mass flow rate Qm is calculated by the signal computation processing portion 8 based on the phase difference in the flow tube vibration generated by Coriolis forces at the points corresponding to the vibration detecting sensors 5, 5. Further, in the tertiary mode vibration type Coriolis flowmeter of the first embodiment of the present invention, the density ρ is also calculated.

As described above with reference to FIGS. 1 and 2, in the tertiary mode vibration type Coriolis flowmeter according to the present invention, the flow tube 3 is vibrated in the tertiary mode, so it is advantageously possible to mitigate vibration leakage. Thus, the tertiary mode vibration type Coriolis flowmeter 1 of the present invention is advantageous in that it can provide a tertiary mode vibration type Coriolis flowmeter of high reliability.

Further, the tertiary mode vibration type Coriolis flowmeter according to the present invention, which performs driving in the tertiary vibration mode, is advantageous in that it is resistant to disturbance vibration.

Further, in the tertiary mode vibration type Coriolis flowmeter according to the present invention, the driving of the flow tube 3 is effected with the central antinode H2, where the amplitude is maximum, so that it is possible to effect driving efficiently.

Furthermore, as stated above, in the tertiary mode vibration type Coriolis flowmeter according to the present invention, the drive device 4 is arranged so as to be situated at the central antinode H2, and the vibration detecting sensors 5, 5 are arranged at the antinodes H1, H3. Further, the displacement polarity of the drive device 4 and the displacement polarity of the vibration detecting sensors 5, 5 are adjusted such that they are in opposite phase with each other in the vibration of the flow tube 3, and, further, in the positive feedback loop of the excitation circuit portion 9, the displacement polarities, which have been in opposite phase with each other in the vibration of the flow tube 3, are converted so as to be in phase with each other. Thus, in the tertiary mode vibration type Coriolis flowmeter 1 according to the present invention, it is advantageously possible to generate a tertiary mode vibration with a single drive device 4.

Furthermore, the tertiary mode vibration type Coriolis flowmeter 1 according to the present invention is advantageous in that it can be provided in a simple structure and at relatively low cost.

Furthermore, the tertiary mode vibration type Coriolis flowmeter 1 according to the present invention is advantageous in that it makes it possible to obtain stable signals through the vibration detecting sensors 5, 5.

Next, with reference to FIG. 3, another embodiment of the tertiary mode vibration type Coriolis flowmeter according to the present invention will be described.

Figure 3:
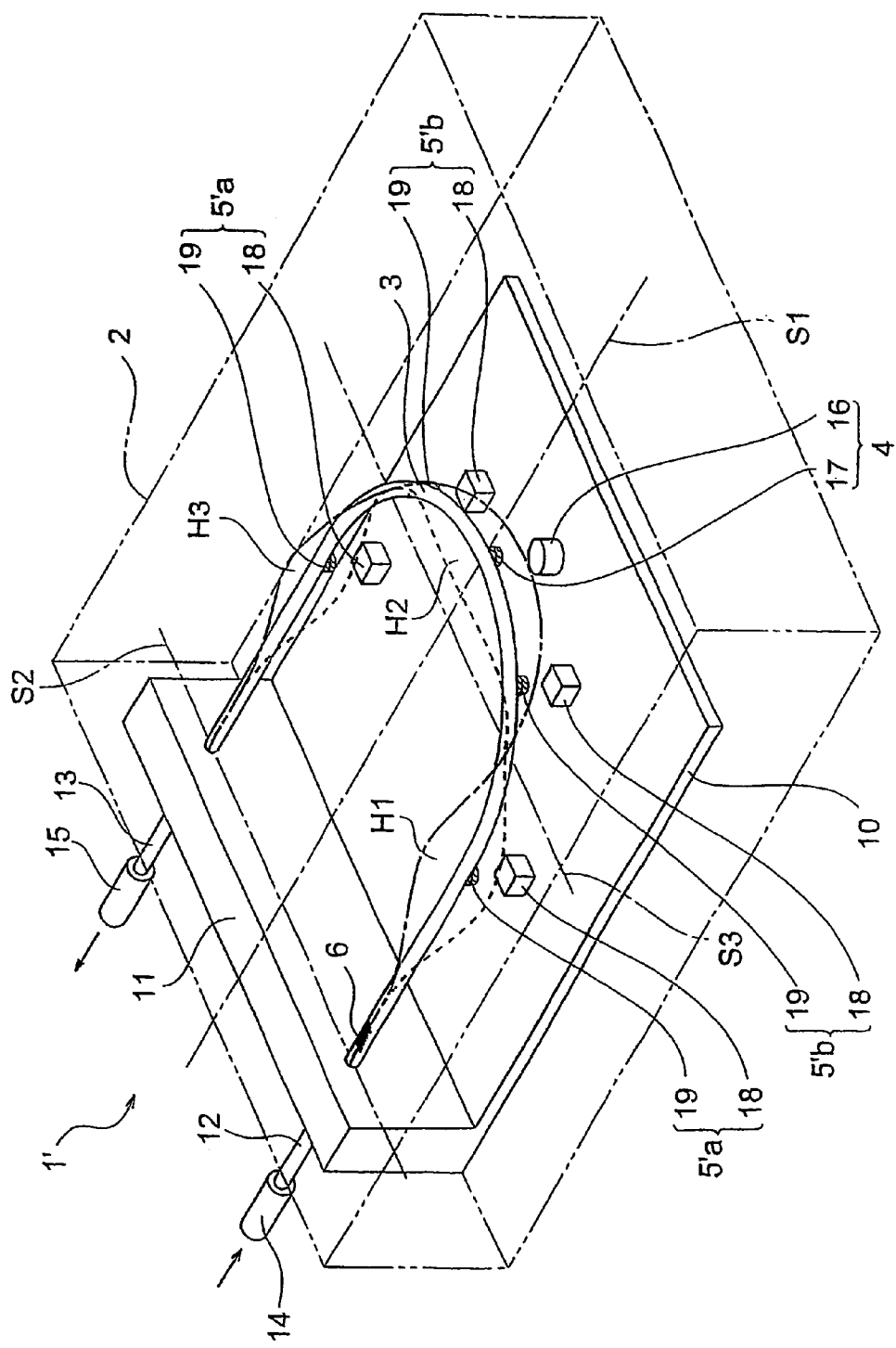
FIG. 3 is a structural view showing a tertiary mode vibration type Coriolis flowmeter according to another embodiment of the present invention.
Figure 4:
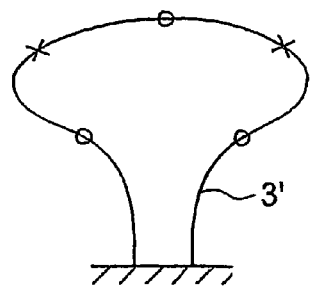
FIGS. 4a-4f are explanatory views of other examples of a flow tube.
Figure 4:
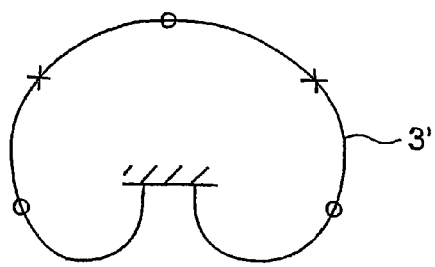
Figure 4:
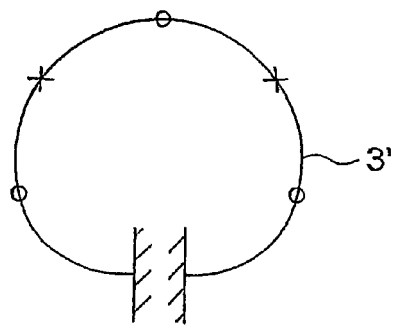
Figure 4:
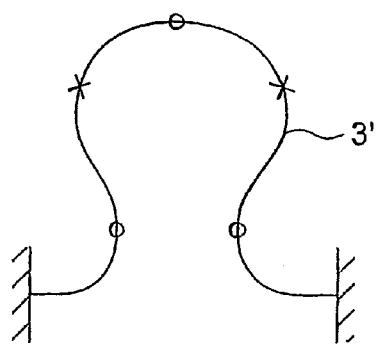
Figure 4:
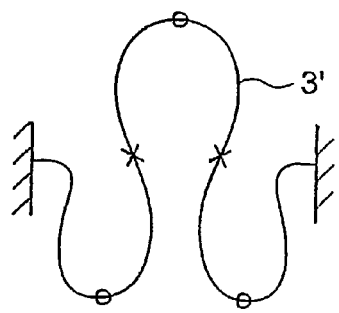
Figure 4:
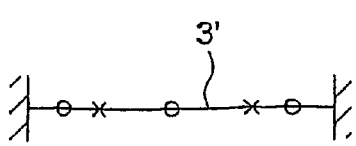

FIG. 3 is a structural view showing a construction of a tertiary mode vibration type Coriolis flowmeter according to another embodiment of the present invention.

FIG. 3 shows a second embodiment of the tertiary mode vibration type Coriolis flowmeter according to the present invention.

In FIG. 3, a tertiary mode vibration type Coriolis flowmeter 1' according to the second embodiment of the present invention differs from the tertiary mode vibration type Coriolis flowmeter 1 of the first embodiment of the present invention in that, instead of the pair of vibration detecting sensors 5, 5 of the tertiary mode vibration type Coriolis flowmeter 1 of the first embodiment of the present invention, there are provided a pair of vibration detecting sensors 5'a, 5'a and a pair of phase difference detecting sensors 5'b, 5'b.

The pair of vibration detecting sensors 5'a, 5'a are sensors for detecting vibration of the flow tube 3; one of the vibration detecting sensors 5'a, 5'a is arranged so as to be in correspondence with the position of the antinode H1 where the amplitude is maximum. Similarly, the other vibration detecting sensor 5'a is arranged so as to be in correspondence with the position of the antinode H3 where the amplitude is maximum. The pair of vibration detecting sensors 5'b, 5'b are sensors for detecting a phase difference that is proportional to Coriolis forces acting on the flow tube 3, and are arranged within the range of the central antinode H2 and at symmetrical positions to the right and left of the drive device 4.

The operational effects of the tertiary mode vibration type Coriolis flowmeter 1' are the same as those described above, so a description thereof will be omitted.

Further, it goes without saying that the present invention allows various modifications without departing from the scope of the present invention. That is, while in the above embodiments the flow tube 3 is formed in a U-shape, it is also possible to form flow tubes 3' of various structures as shown in FIGS. 4(a) through 4(f); e.g., curved tubes (FIGS. 4(a) through 4(e)) and a straight tube (FIG. 4(f)) (In FIGS. 4a-4f, antinodes and nodes in tertiary mode vibration are indicated by reference symbol 0 and reference symbol x, respectively). Further, while in the above-described embodiments only one flow tube 3 is used, it is also possible to effect opposed vibration with two flow tubes arranged symmetrically with each other, or coupled vibration with three flow tubes arranged symmetrically with each other.

The invention claimed is:

1. A tertiary mode vibration type Coriolis flowmeter comprising:
   at least one flow tube, supported at opposite end portions, having inflow and outflow ports;
   a drive device for alternately driving the flow tube; and
   a pair of vibration detecting sensors for detecting a phase difference that is proportional to Coriolis forces acting on the flow tube, wherein:
   in causing the flow tube to make a tertiary mode vibration using the drive device, the drive device is provided at a central antinode from among three antinodes generated by the tertiary mode vibration;
   the pair of vibration detecting sensors are arranged at two antinodes of the three antinodes of the tertiary mode vibration of the flow tube exclusive of the central antinode;
   a displacement polarity of the drive device and a displacement polarity of the vibration detecting sensors are set to be in opposite phase with each other; and
   in a positive feedback loop of an excitation circuit portion for exciting the tertiary mode vibration of the flow tube and the vibration detecting sensors, the excitation circuit portion is structured so that conversion is effected so that the displacement polarities, which have been in opposite phase with each other, are converted to be in phase with each other.

2. A tertiary mode vibration type Coriolis flowmeter according to claim 1, wherein the displacement polarities are made in phase with each other in the positive feedback loop by one of inversely connecting an electric wire including an input line and a signal line, and interposing an inverter.

3. A tertiary mode vibration type Coriolis flowmeter according to claim 2, wherein:
   each of the drive device and the vibration detecting sensors is equipped with a coil and a magnet; and
   the coil is provided on a stationary member that is separate from the flow tube, and the magnet is provided on the flow tube.

4. A tertiary mode vibration type Coriolis flowmeter according to claim 1, wherein:
   each of the drive device and the vibration detecting sensors is equipped with a coil and a magnet; and
   the coil is provided on a stationary member that is separate from the flow tube, and the magnet is provided on the flow tube.

* * * * *